United States Patent [19]

Yamada

[11] Patent Number: 5,237,649
[45] Date of Patent: Aug. 17, 1993

[54] METHOD AND SYSTEM FOR ACQUIRING INTERPOLATION POINTS FROM STRAIGHT SHORT VECTORS REPRESENTING FIGURE IN CURVE FITTING

[75] Inventor: Keiichi Yamada, Oome, Japan

[73] Assignee: Kabushiki Kaisha Toshiba, Kawasaki, Japan

[21] Appl. No.: 511,736

[22] Filed: Apr. 20, 1990

[30] Foreign Application Priority Data

Apr. 20, 1989 [JP] Japan .................................. 1-100534

[51] Int. Cl.$^5$ .............................................. G06F 15/72
[52] U.S. Cl. .................................. 395/142; 395/141; 395/143; 340/728; 340/747
[58] Field of Search ... 364/518, 521, 522, 200 MS File, 364/900 MS File; 340/747, 750, 728; 382/46; 395/141, 142, 143

[56] References Cited

U.S. PATENT DOCUMENTS

| | | | |
|---|---|---|---|
| 4,930,092 | 5/1990 | Reilly | 364/522 |
| 4,979,224 | 12/1990 | Maiocco et al. | 382/8 |
| 5,033,005 | 7/1991 | Haske | 364/474.29 |

OTHER PUBLICATIONS

"Conic B-splines for Curve Fitting: a Unifying Approach", Pham, Binh, Computer Vision, Graphics and Image Processing, vol. 45, No. 1, Jan. 1989, pp. 117–125.

"A Piecewise Linear Approximation Method for Preserving Visual Points of Original Figures"; Aoyama et al., Graphics and CAS 26-5; May 18, 1987.

"A Method of Interpolating Reasonable-Shaped Curves Through Any Data", by J. Butland, Computer Graphics 80 (1980) pp. 409–422.

*Primary Examiner*—Phu K. Nguyen
*Attorney, Agent, or Firm*—Cushman, Darby & Cushman

[57] ABSTRACT

In curve fitting for straight short vectors representing an original figure, an internally dividing point setting section sets, on two adjacent vectors, internally dividing points at which the vectors are divided internally in predetermined ratios. An interpolation point setting section sets the intersection of the straight line passing the internally dividing points of the two adjacent vectors and the perpendicular passing the connecting point of the two adjacent vectors as an interpolation point. In a curve-fitting process section, the curve fitting is performed on the basis of the acquired interpolation point.

10 Claims, 7 Drawing Sheets

METHOD AND SYSTEM FOR ACQUIRING INTERPOLATION POINTS FROM STRAIGHT SHORT VECTORS REPRESENTING FIGURE IN CURVE FITTING

BACKGROUND OF THE INVENTION

1. Field of the Invention

The present invention relates to a method and system for acquiring interpolation points from straight short vectors representing a figure.

2. Description of the Related Art

In obtaining outlines of characters and graphic forms in the field of computer graphics, computer aided design (CAD), generation of outline fonts and so on, a method is generally used which fits Bezier curves or B-spline curves to straight short vectors approximately representing an original figure.

Figure 1:
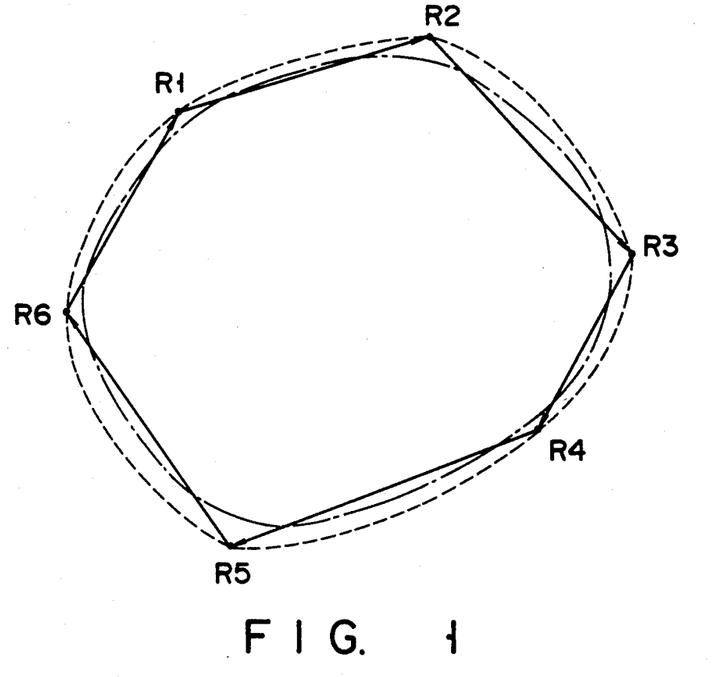
FIG. 1 illustrates an example of curve fitting for straight short vectors.

When a plurality of straight short vectors (R1R2, R2R3, ... R5R6, R6R1, which are shown by solid lines) representing an original figure as shown in FIG. 1 are given, the fitting of a curve (which is indicated dashed) is performed so that it will pass connecting points R1 through R6 of the straight short vectors.

A problem will arise in that, although the straight short vectors approximately represent the original figure, the curve fitted to the straight short vectors is different from the original figure.

In view of the above, methods for curve fitting have been desired which can represent an original figure more accurately o the basis of straight short vectors.

Summary of the Invention

It is an object of the present invention to provide a method and system for acquiring interpolation points from straight short vectors representing a figure.

According to one aspect of the present invention, there is provided a method for acquiring interpolation points from straight short vectors representing a figure each straight short vector being connected to a connecting point, the method comprising the steps of:

acquiring two internally dividing points by internally dividing lengths of two vectors of the straight short vectors into desired ratios;

setting a straight line passing the acquired two internally dividing points; and acquiring the interpolation point on the set straight line.

According to another aspect of the present invention, there is provided a system for acquiring interpolation points from straight short vector representing a figure, each straight short vector being connected to a connecting point, the system comprising:

first acquiring means for acquiring two internally dividing points by internally dividing lengths of two vectors of the straight short vectors into desired ratios;

means for setting a straight line passing the acquired two internally dividing points; and second acquiring means for acquiring the interpolation point on the set straight line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 2:
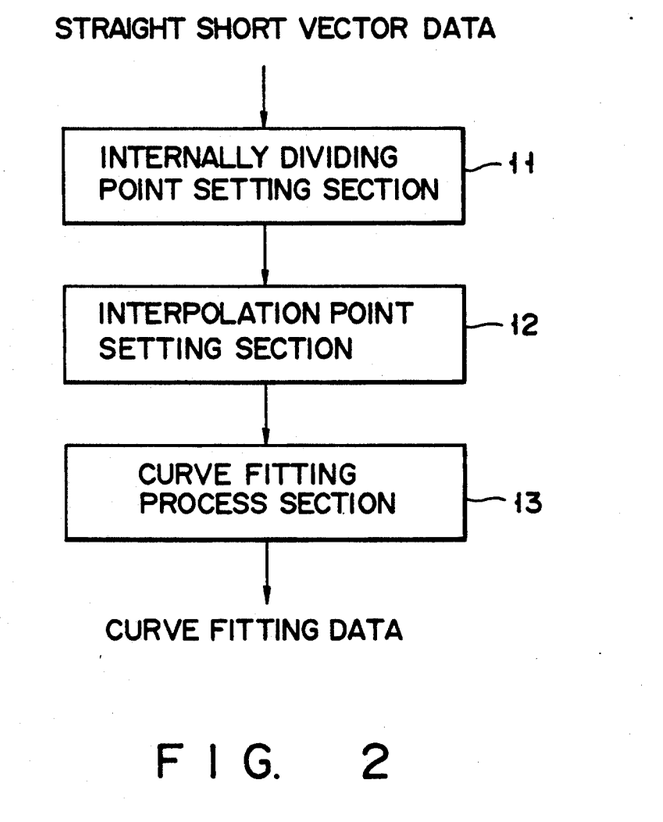
FIG. 2 is a block diagram of a system embodying the present invention.

In FIG. 2, the present system is comprised of an internally dividing point setting section 11, an interpolation point setting section 12 and a curve fitting processing section 13.

Internally dividing point setting section 11 sets a point Ai at which a straight short vector Pi-1Pi ($2 \leq i \leq n-1$) is divided internally in a ratio m-1 : 1 and a point Bi at which a straight short vector PiPi+1 is divided internally in a ratio of 1 : m-1 on the basis of straight short vector data. m is assumed herein to be 6.

Interpolation point setting section 12 sets a point Qi on a straight line Li passing internally dividing points Ai and Bi set by internally dividing point setting section 11.

Curve fitting process section 13 performs a process of fitting a curve to straight short vectors on the basis of interpolation point Qi set by interpolation point setting section 12.

Next, the operation of the present system will be described.

Figure 3:
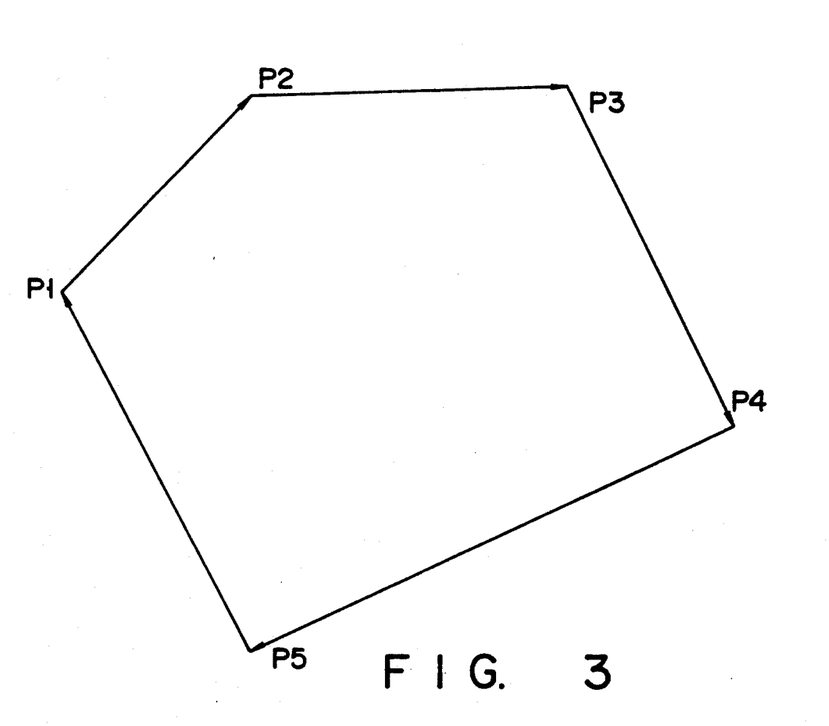
FIG. 3 illustrates straight short vectors to be processed in the present system.
Figure 4:
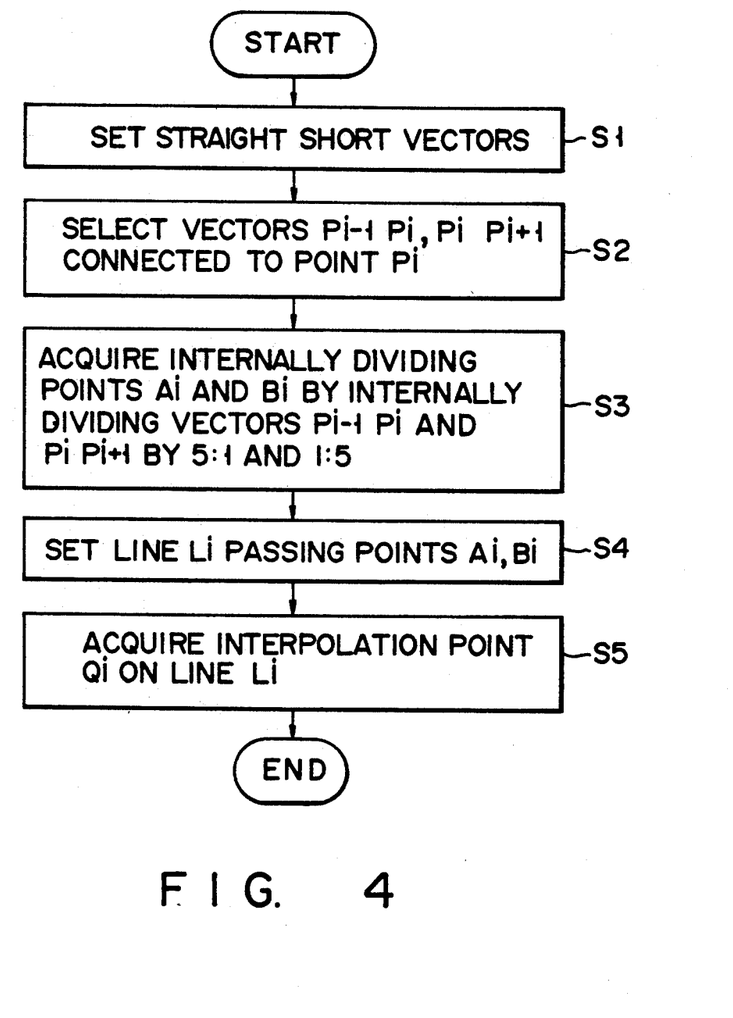
FIG. 4 is a flowchart of the interpolation point acquiring process in the present system.

In the present system, a process of fitting a curve to the straight short vectors as shown in FIG. 3 will be described with reference to the flowchart of FIG. 4. It is assumed that an original figure is indicated by straight short vector P1P2, P2P3, P3P4, P4P5 and P5P1.

In step S1, straight short vector data are set in internally dividing point setting section 11.

In step S2, for example, a point P1 is selected as the first process object.

In step S3, points A1 and B1 at which the lengths of straight short vectors P5P1 and P1P2, which are connected to point P1, are divided internally in ratios of 5 : 1 and 1 : 5, respectively, are acquired.

In step S4, in interpolation point setting section 12, a straight line L1 passing internally dividing points A1 and B1 is set.

Figure 5A:
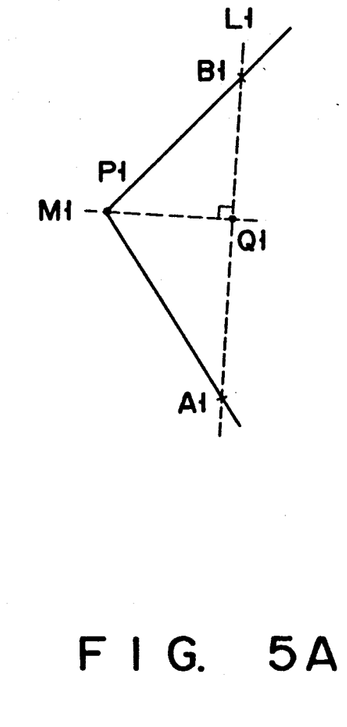
FIGS. 5A, 5B, 6A, 6B, 7A, 7B and through 8 diagrams illustrating the method of acquiring interpolation points in the present system.

In step S5, an interpolation point Q1 on straight line L is acquired as shown in FIG. 5A. It is assumed that interpolation point Q1 is the intersection of straight line L1 and the perpendicular M1 passing connecting point P1.

Figure 5B:
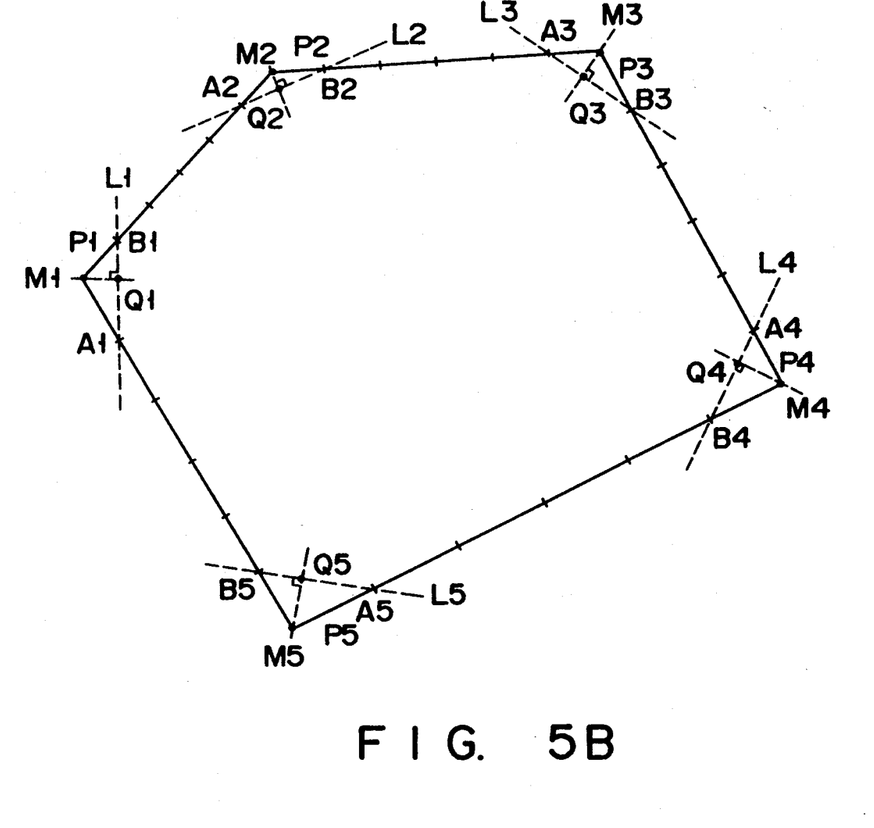

By the above process each of interpolation points Q2 through Q5 corresponding to connecting points P2 through P5 of the straight short vectors is set. Interpolation points Q1 through Q5 are indicated in FIG. 5B.

Figure 6A:
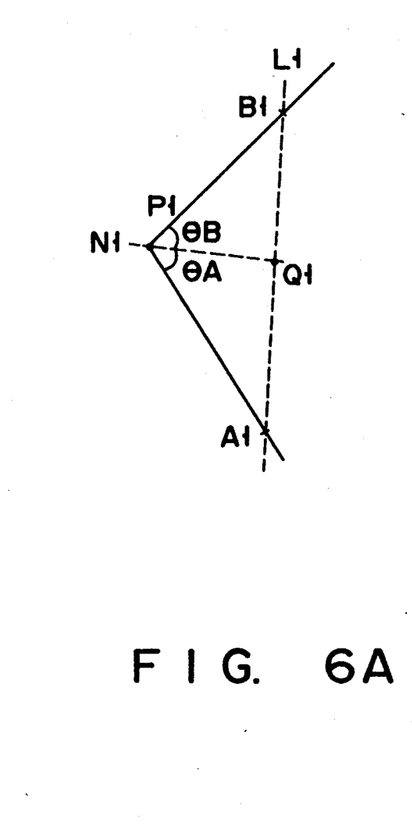
Figure 6B:
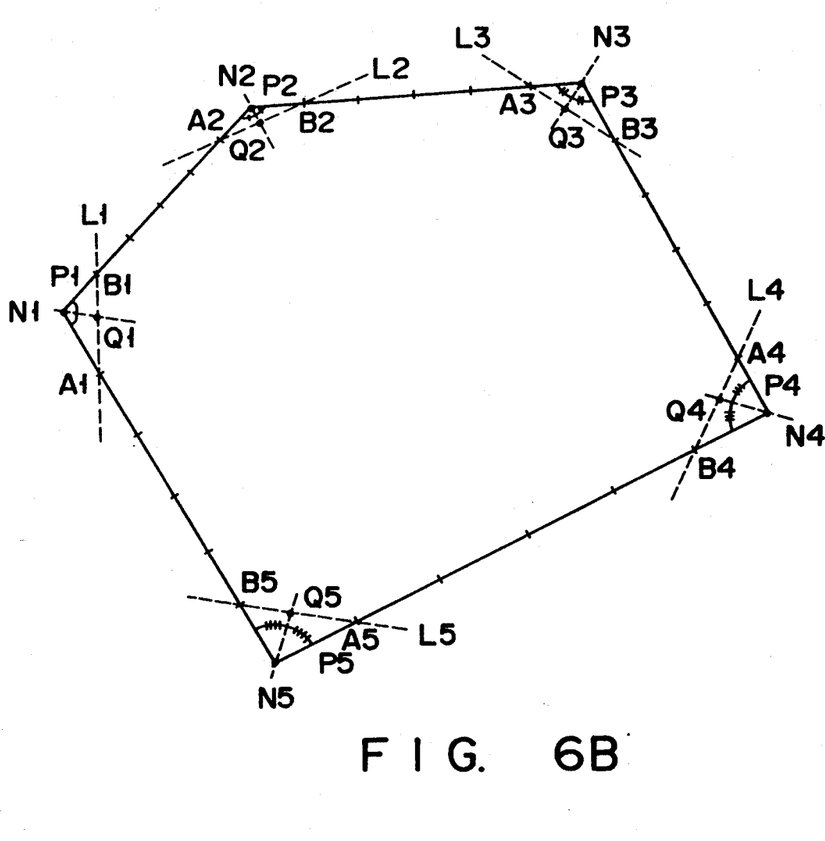

As shown in FIG. 6A, the intersection of the straight line N1, which bisects an angle formed by straight short vectors P5P1 and P1P2 at connecting point P1 such that $\theta A = \theta B$, and straight line L1 may be used as an interpolation point Q1. Interpolation points Q2 through Q5 corresponding to connecting points P2 through P5 of the straight short vectors are set in a similar manner. Interpolation points Q1 through Q5 respectively corresponding to connecting points P1 through P5, respectively are indicated in FIG. 6B.

Figure 7A:
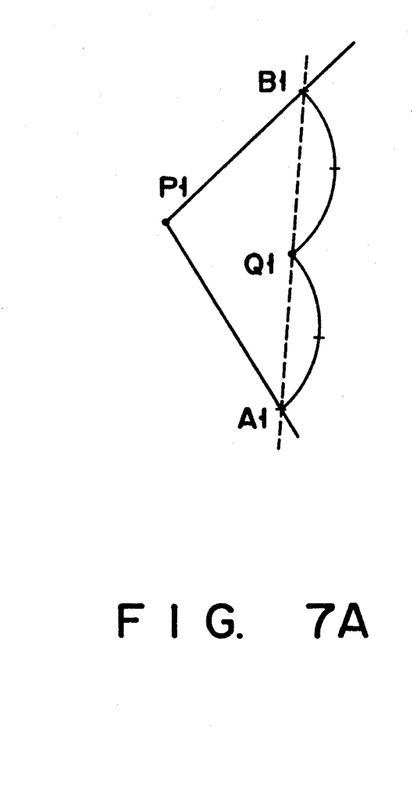
Figure 7B:
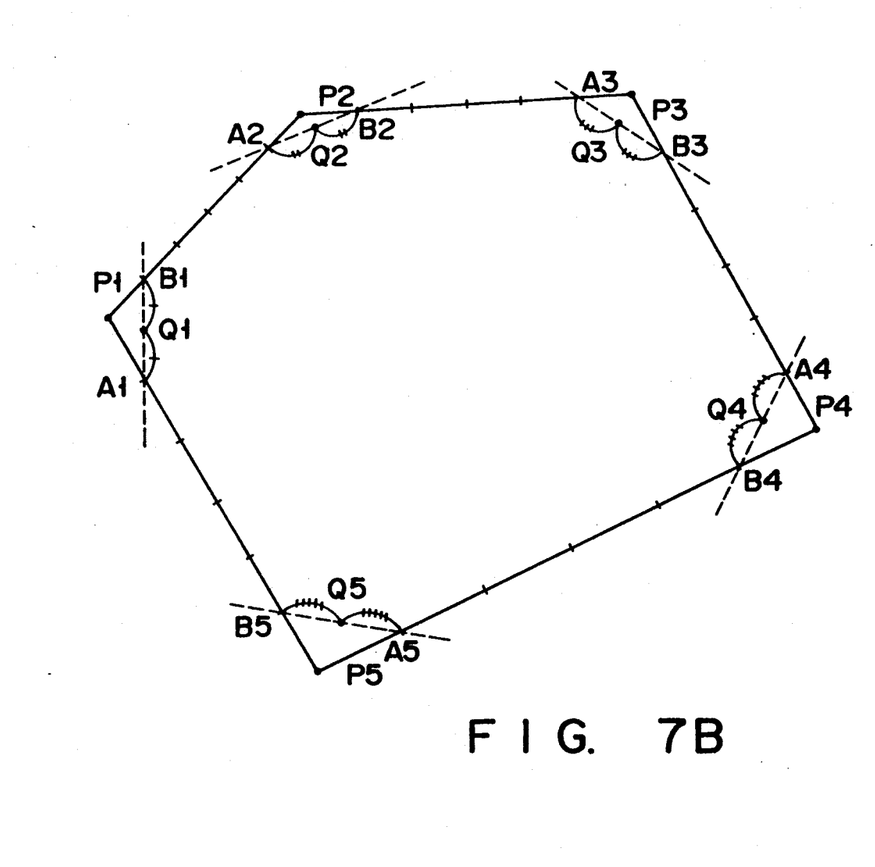

In addition, as shown in FIG. 7A, the middle point of a line segment A1B1 connecting internally dividing points A1 and B1 may be used as interpolation point Q1. Interpolation points Q2 through Q5 corresponding to connecting points P2 through P5 of the straight short vectors are set in the similar manner. Interpolation points Q1 through Q5 respectively corresponding to connecting points P1 through P5 are indicated in FIG. 7B.

Figure 8:
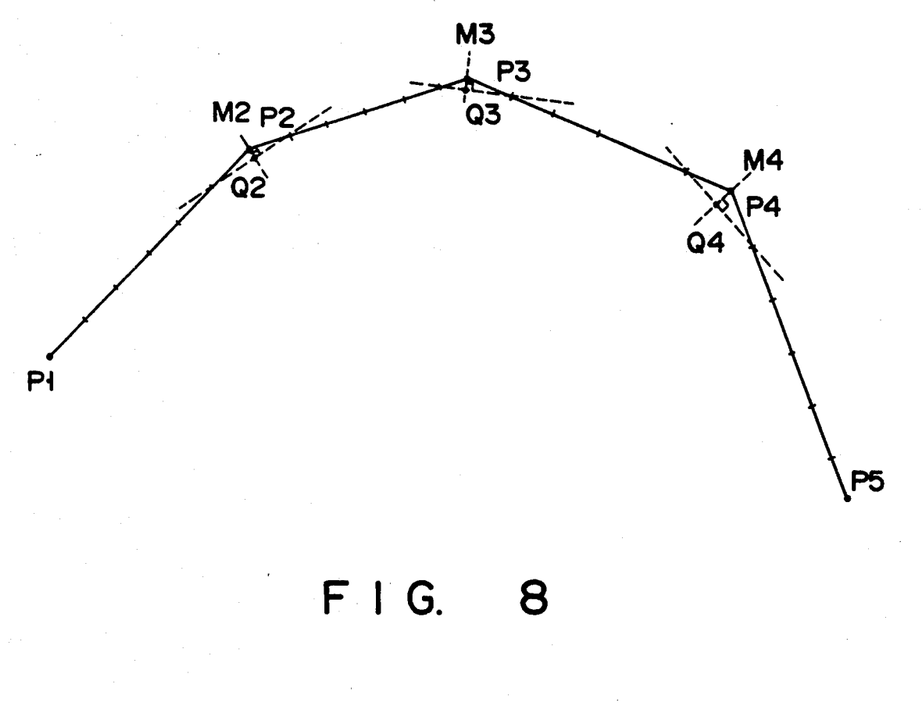

In the above description, the process of acquiring interpolation points for a closed straight short vector series is described. When a non-closed straight short vector series is given, as shown in FIG. 8, interpolation points corresponding to connecting points P2, P3 and P4 are set in the above manner and points P1 and P5 are used for interpolation points Q1 and Q5 corresponding to connecting points P1 and P5.

In curve fitting process section 13, the curve fitting is performed on the basis of interpolation points Q1 through Q5 respectively corresponding to connecting points P1 through P5 of the straight short vectors, thereby obtaining curve fitting data. The curve-fitting method varies according to representation of a curve and the maximum allowable error for interpolation points. For example, a method of fitting a B-spline curve to pass each of interpolation points or a method of estimating the least square error may be used.

Also, the curve fitting using a Bezier curve based on interpolation points may be performed. With this curve fitting, the state of connection of curve segments must be taken into account. For this reason, the following method may be used. That is, an interpolation point Qi on a straight line Li passing internally dividing points Ai and Bi of straight short vectors Pi-1Pi and PiPi+1 and the gradient $\theta i$ of straight line Li are acquired. The gradient $\theta i$ of straight line Li is the gradient at interpolation point Qi (the first derivative at interpolation point Qi). The curve fitting using the Bezier curve is carried out on the basis of interpolation point Qi and the gradient $\theta i$ at interpolation point Qi.

As described above, interpolation point Qi is set on straight line Li passing point Ai to divide straight short vector Pi-1Pi internally in a ratio of m-1 : 1 (m=6 in the present embodiment) and point Bi to divide straight short vector PiPi+1 internally in a ratio of 1 : m-1. The curve fitting is performed by use of an interpolation point Q1. For example, by performing the above curve fitting for the straight short vectors indicated by solid lines in FIG. 1, curve-fitting data indicating a figure that is represented by a dashed and dotted line more closely approximates the original figure.

The obtained curve-fitting data is used in the field of computer graphics, CAD and generation of outline fonts. For example, by fitting a curve to straight short vectors approximately representing a character pattern in accordance with the above method, an outline font close to an original figure can be obtained.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for generating and displaying a curved image comprising the steps of:
   receiving an image in the form of straight short vectors, said straight short vectors corresponding to at least one curve segment;
   determining interpolation points of said straight short vectors, said interpolation points corresponding to connecting points of said straight short vectors, each of said connecting points being a point between two adjoining straight short vectors;
   fitting a curve to said straight short vectors using said interpolation points; and
   thereby generating a curved image in the form of said curve;
   wherein said interpolation points determining step includes the steps of for each one of said connecting points:
   acquiring two internally dividing points by internally dividing lengths of two vectors of said straight short vectors connected to one of said connecting points into desired ratios;
   setting a straight line passing through said acquired two internally dividing points; and
   thereby determining one of said interpolation points on said set straight line for said connecting point.

2. The method according to claim 1, wherein said curve includes a Bezier curve.

3. The method according to claim 1, wherein each of said interpolation points is a point of intersection between said set straight line and a line perpendicular to said set straight line which passes through said corresponding connecting point.

4. The method according to claim 1, wherein each of said interpolation points is a point of intersection between said set straight line and a straight line passing through said connecting point which equally divides an angle formed by two of said straight short vectors.

5. The method according to claim 1, wherein each of said interpolation points is a point in the middle of said set straight line.

6. A system for generating and displaying a curved image comprising:
   means for receiving an image in the form of straight short vectors, said straight short vectors corresponding to at least one curve segment;
   means for determining interpolation points of said straight short vectors, said interpolation points corresponding to connecting points of said straight short vectors, each of said connecting points being a point between two adjoining straight short vectors;
   means for fitting a curve to said straight short vectors using said interpolation points; and
   means for generating a curved image in the form of said curve in response to said fitting means;
   wherein said means for determining interpolation points for each one of said connecting points includes:

means for acquiring two internally dividing points by internally dividing lengths of two vectors of said straight short vectors connected to one of said connecting points into desired ratios;

means for setting a straight line passing through said acquired two internally dividing points; and second means for determining one of said interpolation points on said set straight line for said connecting point.

7. The system according to claim 6, wherein said curve fitting means includes means for fitting a Bezier curve to said straight short vectors.

8. The system according to claim 6, wherein said second interpolation point determining means includes means determining said interpolation point to be a point of intersection between said set straight line and a line perpendicular to said set straight line which passes through said corresponding connecting point.

9. The method according to claim 6, wherein said second interpolation point determining means includes means determining said interpolation point to be a point of intersection between said set straight line and a straight line passing through said connecting point which equally divides an angle formed by two of said straight short vectors.

10. The method according to claim 6, wherein said second interpolation point determining means includes means determining said interpolation point to be a middle point of said set straight line.

* * * * *